Dec. 3, 1935.  M. F. LEACH  2,022,726
AUTOMATIC OILING DEVICE
Filed Nov. 11, 1933
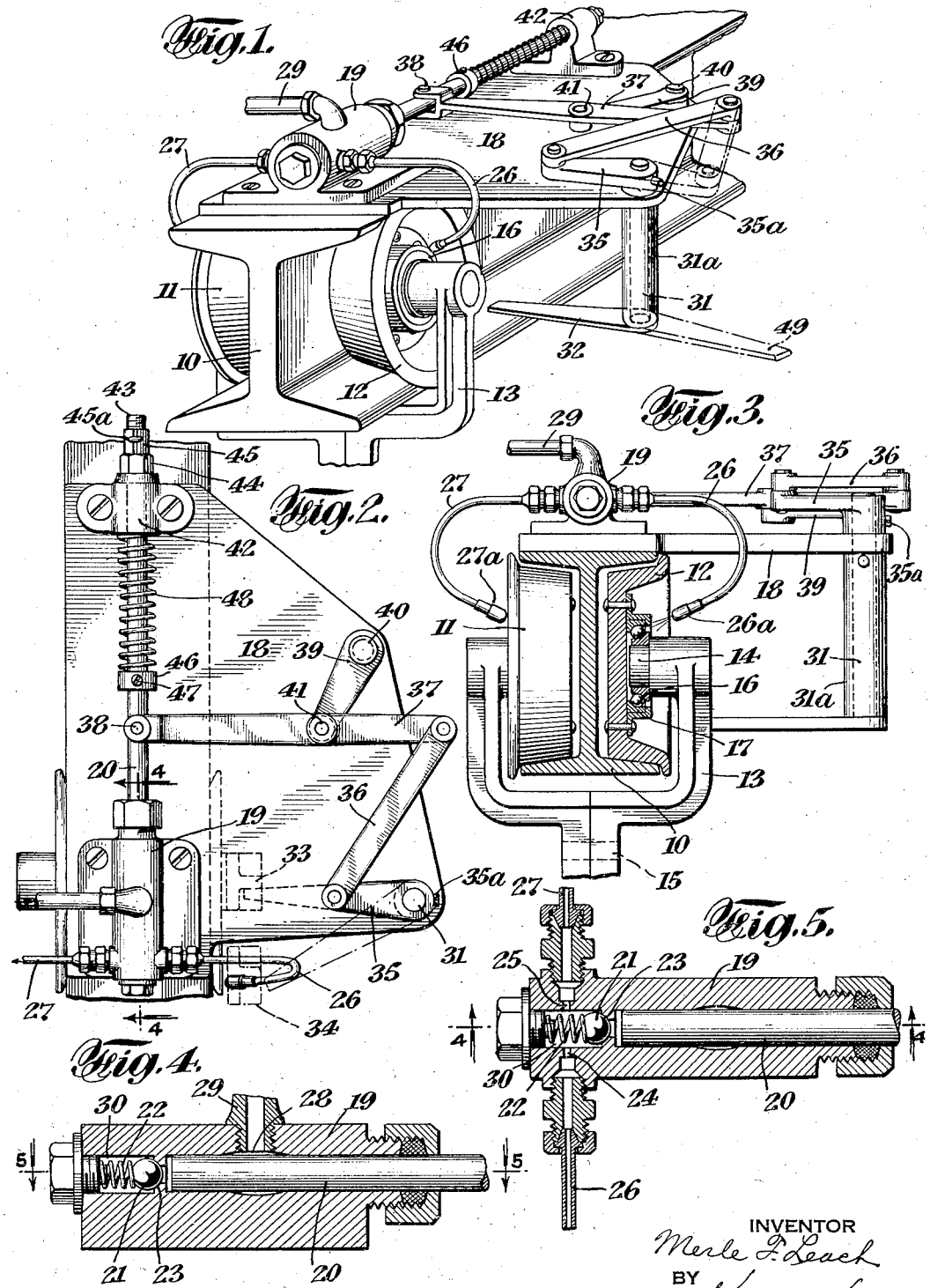
INVENTOR
Merle F. Leach
BY
Kenyon Kenyon
ATTORNEYS.

Patented Dec. 3, 1935

2,022,726

UNITED STATES PATENT OFFICE 2,022,726

AUTOMATIC OILING DEVICE

Merle F. Leach, Yorktown Heights, N. Y.

Application November 11, 1933, Serial No. 697,609

5 Claims. (Cl. 184—3)

This invention relates to an automatic intermittent oiling device for machinery, and in the particular embodiment thereof here described it is shown in a form adapted for the lubrication of the supporting wheels for an overhead conveyor system.

Among the objects to which this invention is directed is the provision of an automatic intermittent oiling device adapted to be actuated by movement of the part to be oiled or some part associated therewith past an oiling station, and arranged to eject a measured quantity of oil from a spout or nozzle adjacent the part to be oiled as it passes the oiling station. Another object of the invention is to provide a simple and effective means for rendering the device inoperative when its use is not required without at the same time introducing additional moving parts. Further objects and advantages are hereinafter described.

It has heretofore been necessary, in applying lubricant to the moving parts of successive units of a conveyor system which cannot be stopped or taken out of operation for purposes of lubrication, to daub oil by hand on the parts to be oiled as they successively pass a given point in the system.

The disadvantage of such hand oiling is that, in addition to the expense of hand lubrication, the oil must be applied rapidly as the part to be oiled moves past, and hence there is a tendency for the operative to waste oil by applying an excess thereof adjacent the parts to be oiled, in the effort to make sure that some oil will penetrate to the desired part to be oiled.

One purpose of the present invention is to eliminate the necessity for hand oiling, and at the same time to furnish means for intermittently applying oil in accurately measured quantities and in accurate alignment with the part to be oiled, and in exactly timed relation to the passage thereof past the oiling station, to the end that the necessity of hand labor may be avoided, and the amount of oil or other lubricant consumed may be efficiently applied without waste.

In the description which follows the device will be disclosed in connection with the lubrication of an overhead conveyor system comprising a yoke and two wheels, engaging opposite sides of an I-beam rail, and more particularly to the oiling of such apparatus where the part to be oiled consists of ball bearings running in a ball race forming the supporting bearing for each of these wheels. It will be distinctly understood, however, that the invention is not limited in its application to the oiling of any particular type of moving machinery, but is adapted to the lubrication of any type or kind of machinery in which a substantial number of parts to be lubricated move in succession past a lubricating station.

In the drawing hereto annexed and forming a part of this specification—

Figure 1 is a perspective of the entire device.

Figure 2 is a plan view thereof.

Figure 3 is an end elevation of the device, the I-beam rail being shown in section.

Figure 4 is a vertical section of the measuring cylinder on the line 4—4 of Figs. 2 and 5; and Figure 5 is a horizontal section of the measuring cylinder on the line 5—5 of Fig. 4.

In the groove on each side of an I-beam rail 10 are mounted for longitudinal movement thereof wheels 11 and 12. A yoke 13 provided with bearings 14 for the wheels 11 and 12 secures the wheels in fixed relation with respect to each other, the whole constituting a travelling carriage, and provides means 15 for the support of an article to be conveyed and, if desired, a driving connection for the carriage. Ball bearings 16 within a ball race 17 are mounted upon the bearings 14 and furnish the support for the wheels 11 and 12.

The common practice in factories, such for example as assembly plants, is to provide one or more rails such as the I-beam 10, and to mount thereon a substantial number of travelling carriages such as the yoke 13 and its associated wheels 11 and 12. There may be more than a hundred such carriages. In many instances successive carriages are coupled or linked together, and a large number of them is moved slowly along the rail at a constant rate of speed by an appropriate driving means. The present description, to illustrate one adaptation of the invention, is directed chiefly to the disclosure of an automatic lubricating device for such a conveyor system.

Upon the top of the rail or beam 10 is mounted a supporting plate 18 projecting to some extent laterally of the rail. Preferably such a plate is secured to the rail by welding. Upon plate 18 is mounted a cylinder 19 having a plunger 20 therein adapted to move longitudinally of the cylinder. At one end of the cylinder is an outlet chamber 30 in which is positioned a ball 21 held by a spring 22 against a seat 23. The spring, ball and seat provide a one-way valve permitting oil to flow from the cylinder to chamber 30, but closing when pressure within the cylinder is reduced, for a purpose hereinafter set forth.

At the discharge side of this valve are two ports 24 and 25 communicating respectively with pipes 26 and 27. These pipes are preferably made of bendable copper and may if desired be provided with detachable nozzles 26a and 27a respectively disposed adjacent the part to be oiled as it reaches the oiling station. In the form of device here shown, the pipes 26 and 27 are bent downwardly and inwardly on each side of the rail so that the nozzles approach as nearly as may be the ball race where the oil is to be applied. The discharge nozzles of these pipes must be so positioned that they will clear all moving parts of the mechanism to be oiled. These nozzles are detachable for cleaning and for substituting another nozzle of different orifice in case it is desired to change the size of the stream of oil to be ejected upon the part to be oiled.

The cylinder 19 is provided with an inlet port 28. The plunger 20, actuated by the mechanism hereinafter described, is adapted to reciprocate longitudinally within the cylinder 19 and, in such movement, to cover and uncover the port 28. The arrangement of the parts is such that as the plunger 20 moves outwardly from the one-way valve on its suction stroke the one-way valve closes and a vacuum is created within the cylinder. Further movement of the plunger 20 in the same direction uncovers the inlet port 28. This port is connected to a source of oil (not shown) by a pipe 29. As further movement of the plunger 20 causes the end thereof to uncover the port 28, the pipe 29 and the interior of the cylinder 19 are brought into communication and oil from the source of supply flows, by reason of the difference in pressure, into the vacuum in the cylinder.

In this way the proper quantity of lubricant is drawn from the source of supply and is accurately measured. It makes no difference how far the plunger 20 is retracted within the cylinder, since an excess of oil drawn into the cylinder by an overthrow of the plunger will be re-expelled through the feed pipe on the return stroke of the plunger. The strength of the spring 22, forming a part of the one-way valve, is so adjusted as to assure that such excess will be returned to the inlet pipe, and that the valve will not open until the plunger has travelled far enough on its return stroke to cover and seal the inlet port 28. The quantity of oil remaining within the cylinder when such excess has been returned to the inlet pipe, and when port 28 is closed, is the largest quantity required for the lubrication purpose to which the device is adapted, and this quantity is determined by the size and shape of the cylinder and the distance of the inlet port from the outlet end thereof. Within the limits established by these dimensions the desired quantity of oil to be expelled from the cylinder on each compression stroke of the plunger may be adjustably determined by setting up the adjusting nut 44 referred to below.

When the plunger 20, on its return stroke, has covered port 28 and sealed the same, further return movement of the plunger 20 increases the pressure upon the measured charge of oil within the cylinder and under the influence of such pressure the spring 22 compresses and ball 21 lifts from its seat 23 permitting the charge of oil to flow into chamber 30, from which it flows outwardly through ports 24 and 25 and through pipes 26 and 27 and is discharged upon the part to be oiled.

The actuating mechanism for the plunger 20 is as follows: A shaft 31 is journaled within a downwardly projecting sleeve 31a secured to a laterally extending portion of the plate 18. Upon the lower end of this shaft is secured a trip arm 32 adapted to engage any part of the moving machinery to be oiled. In the instance here described, trip arm 32 is arranged to be engaged, when in its operative position, by the yoke 13 of the traveling carriage. Such engagement first occurs when the traveling carriage is at a point in advance of the oiling station, indicated at 33 in Fig. 2, and the arrangement is such that movement of the yoke 13 along the rail 10, after the yoke has engaged the trip arm 32, will deflect this arm from the position of initial engagement to the position indicated at 34 in Fig. 2, when arm 32 has been moved out of the path of travel of the yoke and returns under the influence of spring 48 to its original position. At this instant, the part to be oiled has reached the oiling station. Such deflection of trip arm 32 causes it to move pivotally about the center of shaft 31 and to rotate shaft 31 to a corresponding extent.

Upon the upper end of the shaft 31, and in operative position arranged to project inwardly above the upper surface of plate 18, is mounted an arm 35 adapted to be secured in adjusted position upon shaft 31 by means of set screw 35a. To the free end of arm 35 is pivotally secured a link 36, the other end of which is pivotally secured to one end of lever 37. Lever 37 is forked at its opposite end to engage, pivotally through a pin 38, a continuation of the plunger 20. A link 39, pivotally mounted upon pin 40 secured to plate 18, is pivotally secured by pin 41 to lever 37 near, but not necessarily at, the midpoint thereof.

The arrangement is such that rotation of shaft 31 in a counter-clockwise direction (as seen in Fig. 2) depresses the outer or right hand end of lever 37 (as seen in Fig. 2), and raises the inner forked end of lever 37 and thereby partially withdraws plunger 20 from cylinder 19. The arrangement of parts is such that plunger 20 is moved outwardly to an extent sufficient to uncover inlet port 28.

The system of linkage above described is such that lever 37 has a floating fulcrum, and accordingly the motion which it imparts to plunger 20 is in a straight line and not on the arc of a circle. The arrangement is such, also, that trip arm 32 may be readily moved to inoperative position as described below.

Plunger 20, at its end remote from cylinder 19, is mounted in a guideway 42 secured to plate 18 and upon a screw threaded portion 43 of said plunger, extending beyond the guideway, is mounted an adjusting nut 44 adapted to seat against the end of the guideway to provide an adjustable stop for measuring the quantity of oil to be delivered. A sleeve 45 integral with nut 44 is longitudinally split in four places on two diameters at right angles to each other, and a cotter pin 45a may be passed through a hole in the portion 43 to secure the nut 44 at any quarter turn thereof to maintain it in the desired adjusted position. A collar 46 is adjustably secured to the plunger 20 by screw 47 to furnish means for adjusting the tension of the spring 48. A main spring 48, surrounding plunger 20, bears at one end against collar 46 and at its other end against guideway 42.

The operation of the device is as follows: As a carriage to be oiled approaches the oiling station a part thereof engages trip arm 32 and rocks the same about the center of shaft 31 against the resistance of spring 48 until the arm has been moved out of the line of travel of the carriage, when it disengages and moves back to its original position. The deflection of arm 32 from its original position causes, through the train of linkage described above, the plunger 20 to move outwardly from cylinder 19 reducing the pressure therein and at the same time compresses the spring 48. A partial vacuum is set up in the cylinder 19 until plunger 20 has cleared and opened inlet port 28.

Thereupon oil rushes in from the source of supply to fill the chamber within cylinder 19. When trip arm 32 has cleared the moving machinery, spring 48 forces plunger 20 to return to its original position in the cylinder, and at the same time through the linkage returns trip arm 32 to its original position. A pumping action is thus set up within the cylinder 19 forcing a measured charge of oil outwardly through pipes 26 and 27 and discharging the same upon the ball and raceway to be oiled. The operation is repeated as often as a carriage to be oiled passes the oiling station.

When it is desired to render the device inoperative, trip arm 32 is manually moved in a counter-clockwise direction to the position shown at 49. In so doing the spring 48 is at first compressed, then as link 36 crosses the axis of shaft 31 the tension of this spring acts to pull arm 35 and trip arm 32 to the inoperative position shown at 49 in Fig. 1, and to maintain them there against accidental displacement. In this position trip arm 32 is out of the path of travel of the carriage, and the device is rendered inoperative and securely held in that position by the spring 48 until it is desired to restore it to use. In that event, the arm 32 is moved by hand in clockwise direction across dead center to operative position. In this way a toggle effect is obtained, furnishing an effective and convenient means for throwing the oiling mechanism to inoperative position and securing it there without introduction of additional parts.

By suitable adjustment of the adjusting nut 44, and by suitable adjustment of the position of the collar 46 upon plunger 20, the mechanism may be adjusted to discharge oil at the proper time and in the proper quantities at the position desired. Further adjustment may be made by bending pipes 26 and 27 to position accurately the discharge thereof, and by attaching thereto nozzles 26a and 27a of suitable orifice size to deposit the entire desired stream of oil upon the part to be oiled, within the limit of time available as it passes the oiling station.

While I have confined this description to a single specific embodiment of my invention, it is my belief and understanding that my invention may be modified in many ways and that it is suited to the lubrication of mechanisms other than the particular type of overhead conveyor system here used for purposes of illustration, and I do not desire to be limited either to the particular form of oiling mechanism here shown or to an oiler for the particular form of overhead conveyor system here shown, but intend that my invention shall be taken as covering all forms and applications thereof which fall within the proper scope of the following claims.

I claim:

1. In an intermittent oiling mechanism, in combination, a cylinder for measuring a quantity of oil to be discharged upon a moving part to be oiled, a plunger for reciprocating movement within said cylinder, a pivotally mounted trip arm having a free end adapted to be positioned in the path of travel of said part to be oiled and also adapted to be moved at will to inoperative position out of said path of travel, means linking said trip and said plunger, and resilient means so arranged and related to said trip arm as to oppose movement of said arm from said first-mentioned position and also to oppose movement of said arm from said second-mentioned position.

2. In an intermittent oiling device, in combination, means to measure a predetermined quantity of oil and to discharge the same upon a part to be oiled, an actuating plunger therefor, a stub shaft adjacent the path of movement of a part to be oiled, a trip arm secured upon said shaft and adapted in one position to extend into said path of movement, an arm also secured upon said shaft, linkage connecting said arm with said plunger, said linkage being adapted to permit rotation of said stub shaft to move said trip arm to a second position out of said path of travel, and means associated with said linkage to yieldingly secure said trip arm in either of said positions.

3. An apparatus of the class described, comprising in combination a trackway for the support of successive units of machinery adapted to move therealong, a support in fixed relation thereto adjacent the path of travel of said units of machinery, a trip pivotally mounted on a pivot fixed in said support and with a part thereof normally extending into said path of travel and adapted to be engaged and deflected by successive units of machinery as they move along said trackway, an oil cylinder, inlet and outlet ports therefor, a plunger reciprocable within said cylinder and adapted to expel oil therefrom through said outlet port, linkage connecting said trip and said plunger, and a spring operative upon disengagement of said trip from contact with one of said units of machinery moving along said trackway to move said plunger within said cylinder and to expel a charge of oil through said outlet port upon a part of said unit of machinery to be oiled.

4. An apparatus of the class described, comprising in combination a trackway for the support of successive units of machinery adapted to move therealong, a support in fixed relation thereto adjacent the path of travel of said units of machinery, a spring-held control means mounted on said support and normally extending into the path of travel of said units of machinery and adapted to be engaged successively by each of said units, to be deflected by each thereof, and to return to normal position under the influence of said spring when each of said units has moved sufficiently along the trackway to disengage said control means, and means responsive to the deflection of said control means to measure a charge of oil, and responsive to the return of said control means from deflected to normal position to discharge said measured charge of oil upon a part of said unit of machinery to be oiled.

5. In a device of the character described, trip means having a portion adapted to move to a position in, and also to a position out of, the path of travel of moving units of machinery to be oiled, common resilient means adapted to oppose movement of said trip means from said first-mentioned position and also from said second-mentioned position, and intermittent oiling means responsive to movement of said trip means from its first-mentioned position to measure a quantity of oil, and responsive to movement thereof toward its first-mentioned position to discharge a measured quantity of oil upon a part to be oiled.

MERLE F. LEACH.